United States Patent [19]

Baek

[11] Patent Number: 5,779,212
[45] Date of Patent: Jul. 14, 1998

[54] ANGLE COMPENSATOR FOR A MONITOR STAND

[75] Inventor: Soon-Ki Baek, Suwon-si, Rep. of Korea

[73] Assignee: SamSung Electronics Co., Ltd., Suwon, Rep. of Korea

[21] Appl. No.: 668,644

[22] Filed: Jun. 20, 1996

[30] Foreign Application Priority Data

Jun. 20, 1995 [KR] Rep. of Korea ............... 13963/1995

[51] Int. Cl.$^6$ ........................................... A47G 29/00
[52] U.S. Cl. ................................... 248/371; 248/923
[58] Field of Search ............................ 248/917, 919, 248/920, 921, 922, 923, 371, 133, 183.2

[56] References Cited

U.S. PATENT DOCUMENTS

| | | | |
|---|---|---|---|
| 4,554,590 | 11/1985 | Chelin et al. | 248/921 X |
| 4,562,988 | 1/1986 | Bumgardner | 248/921 X |
| 5,145,134 | 9/1992 | Hashimoto et al. | 248/923 X |
| 5,209,446 | 5/1993 | Kawai | 248/920 X |

*Primary Examiner*—Ramon O. Ramirez
*Attorney, Agent, or Firm*—Robert E. Bushnell, Esq.

[57] ABSTRACT

An improved view angle compensating apparatus for use with a monitor display is disclosed, in which the body of a monitor display is prevented from being disassembled from a monitor stand support when an excessive force is being applied thereto during a compensation period of a view angle. The apparatus includes a monitor rotator integrally assembled to the bottom surface of the body of a monitor for compensating a left or right rotational angle of the protrusion at its rotation portion; and a monitor stand support comprising of a combination of left and right rotational angle compensating rib, respectively extended from both sides of the upper surface of supporting portion thereof, for controlling a turn of a fixed protuberance of the monitor rotator to rotate within a prescribed range of an angle in the left or right direction so that a view angle compensation of the monitor is performed, an elastic tab formed by a cut-opening a portion of the supporting portion so that the right rotational angle compensating rib is enabled to flexibly move upwardly or downwardly, a support tab extended downwardly from an end portion of the elastic tab, for enabling the rotating portion and the supporting portion to be assembled or disassembled, as necessary, by pulling down or pushing up the elastic tab, an engagement tab extended horizontally from the lower portion of the support tab so as to allow a viewer to easily move the support tab: and a plurality of rotation preventing protrusions extended downwardly from the bottom surface of the engagement tab to reach the upper surface of a table on which the monitor stand support is located, for supporting the elastic tab when an excessive force is being applied to the body of a monitor for compensating a view angle of the screen of a monitor.

16 Claims, 3 Drawing Sheets

ANGLE COMPENSATOR FOR A MONITOR STAND

CROSS REFERENCE TO RELATED APPLICATIONS

This application makes reference to incorporates the same herein, and claims all benefits accruing under 35 U.S.C §119 from an Utility Model application entitled MONITOR STAND ANGLE COMPENSATING APPARATUS earlier filed in the Korean Industrial Property Office on 20 Jun. 1995 and there duly assigned Ser. No. 13963/1995.

BACKGROUND OF THE INVENTION

1. Field of the Invention

The present invention relates in general to stands for supporting video monitors at adjustable angles of view, and more particularly, to angle compensators for monitor support stands capable of preventing the video monitor from becoming uncoupled from its supporting stand when excessive force is applied to the video monitor during adjustment of the angle of view.

2. Background Art

Generally, it is well known in the art that the viewing angle of a video monitor mounted upon a supporting stand may be varied by directly moving the monitor in up, down, right and left directions relative to the stand. I have found that when an excessive force is applied to a typical video monitor mounted upon a contemporary supporting stand however, a protuberance from the underside of the housing for the monitor is forced against a right rotational angle compensating rib, thereby causing an elastic tab that is integrally formed therewith to bend downwardly. Consequently, the protuberance is then free to rotate and able to turn the right rotational angle compensating rib and is thereby able to rotate beyond the view angle compensation range. The monitor's rotator may then be turned at an angle then and uncoupled from the support stand. Since monitor's rotator is cast as an integral part of the body of the monitor, the removal of the rotator from the supporting stand entails a concomitant uncoupling of the body of the monitor from its supporting stand. Accordingly, I have observed that with this type of a conventional configuration, a video monitor can easily be unintentionally uncoupled from its supporting stand when excessive force is applied to the monitor in an effort to vary the viewing angle by rotating monitor body relative to its supporting stand. Consequently, because the body of the monitor is relatively top heavy and unwieldly, and because its rotator lacks a flat base, the monitor is likely to tumble off of its supporting stand whenever it is inadvertently uncoupled from its supporting stand, and is then very liable to be damaged by falling onto the floor.

SUMMARY OF THE INVENTION

Accordingly, it is an object of the present invention to provide an improved stand for supporting a video monitor.

It is another object to provide a view angle compensator for a video monitor.

It is still another object to provide apparatus preventing the housing of a video monitor from coming uncoupled from a stand supporting the monitor whenever excessive force is applied to the housing while adjusting the angle of view angle of the monitor.

It is yet another object to provide a stand for supporting a video monitor, able to accommodate manual rotation of the monitor relative to the stand while obstructing inadvertent uncoupling of the monitor and its stand while the stand supports the monitor in an upright position.

It is still yet another object to provide a view angle compensator for a video monitor capable of preventing a the housing of a monitor from coming inadvertently uncoupled from its supporting stand while the angle of view of the monitor is being manually adjusted by rotation of the housing relative to the stand.

To achieve those and other objects, there is provided a view angle compensator for a video monitor having a housing constructed with a rotator integrally assembled to the bottom surface of the housing, configured to rotatingly engage a support stand. The support stand is constructed to simultaneously support the video monitor in an upright position while controlling the rotational angle of the monitor relative to the stand. The structure of the stand has a view angle compensator that prevents the housing of the monitor and the stand support from becoming inadvertently uncoupled while supported by the stand in an upright position, when force is applied to the housing of the monitor in an effort to adjust the angle of view of the monitor.

The view angle compensation is achieved with the monitor's rotator being constructed with a rotatable member having a convexly shaped portion located at substantially the center portion of the bottom surface of the rotator, to allow the angle of view to be adjusted towards any direction. An rectangularly shaped assembly hole is formed in the center surface of the rotatable member and a fixed protuberance extends from the bottom surface of the rotating portion to left and right rotational angles. The supporting stand is constructed with a supporting portion that is convex in shape, slidingly contacting the rotatable member of the monitor rotator to enable adjustment of the angle of view, an assembly protuberance that extends upwardly from the central portion of the supporting portion, to fit into and lockingly engage the assembly hole in the rotating portion. A pair of left and right rotational angle compensating ribs, respectively extending from both sides of the upper surface of the supporting portion, control the rotation of the fixed protuberance of the monitor rotator in the left and right directions within a prescribed range of angle. An elastic tab formed by a cut-open of a portion of the bottom surface of the supporting portion allows flexible movement of the right rotational angle compensating rib in the up and down directions. A support tab extending downwardly from the end portion of the elastic tab allows coupling and uncoupling between the rotating portion and the supporting portion by permiting flexible up and down movement, and an engagement tab pulls the end portion of the support tab. View angle compensation according to the principles of the present invention further contemplates a rotation prevention protrusion arranged to prevent the elastic tab from being bent in a downward direction when excessive force is applied to the support tab while attempting to manually adjust the viewing angle. The rotation prevention protrusion protrudes as an extension from the bottom surface of the engagement tab, and is arranged to support the support tab in balance. The rotation prevention protrusion is positioned to contact the bottom surface of the support stand, and thereby preventing the support tab from moving downwardly.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
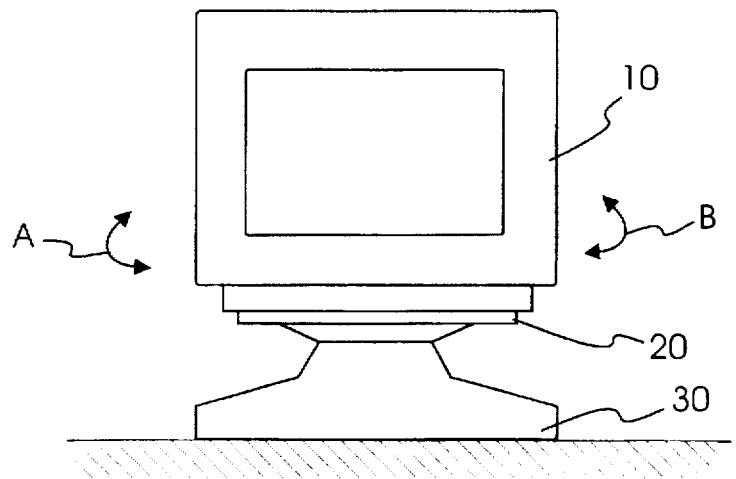
FIG. 1 is a front elevational view of a conventional video monitor display mounted on a stand, for use in a computer system.

Referring to FIG. 1, a conventional configuration of a video monitor is shown. The video monitor includes the body 10 of the monitor, rotator 20 integrally assembled on the bottom surface of the housing forming the body 10 of the monitor, and support stand 30 assembled with monitor rotator 20 for controlling a view angle of the screen of the visual video display provided by the monitor while simultaneously supporting the housing of the body 10 of the video monitor. According to the posture and location of a viewer, the viewing angle of the monitor is adjusted from time to time, by manually grasping and forcibly rotating body 10 relative to stand 30, as is indicated by directional arrows A and B.

Figure 2:
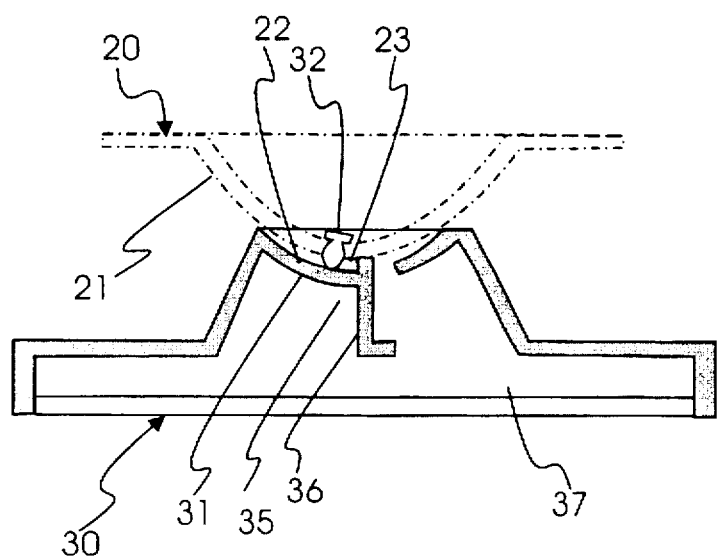
FIG. 2 is a cross-sectional elevational view of the conventional monitor rotator and a typical stand supporting the monitor, in assembled form.
Figure 3:
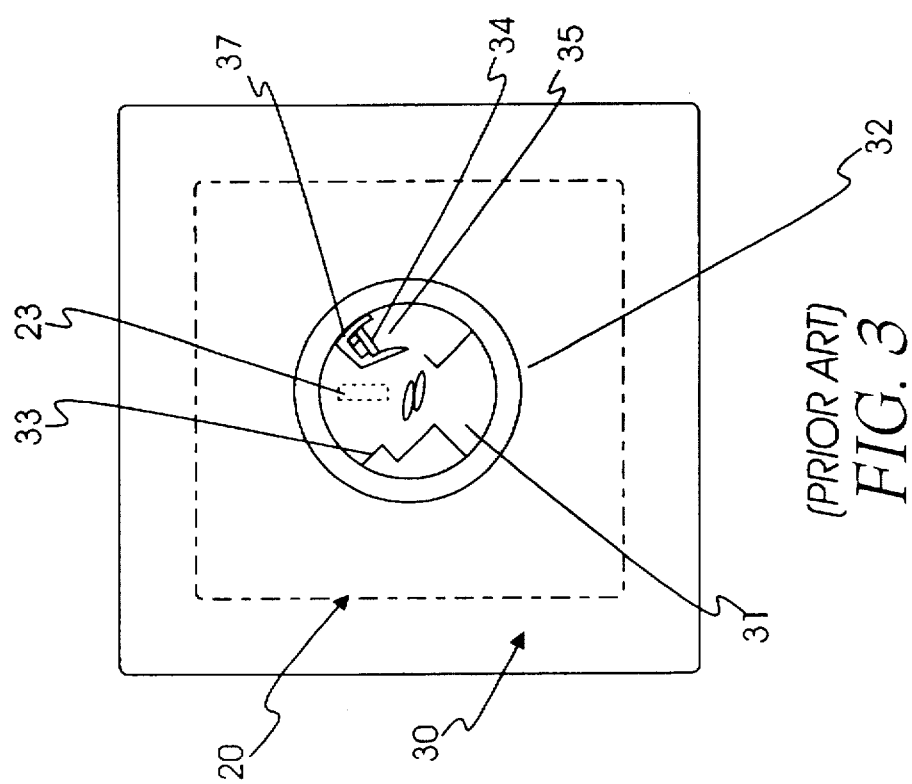
FIG. 3 is a plan view of a conventional monitor rotator and the stand supporting the monitor shown in FIG. 2, in assembled form.

Turning now to FIGS. 2 and 3, monitor rotator 20 includes a rotating portion 21 having a convexly shaped configuration that is positioned in a substantially central location on the bottom surface of rotator 20, to enable adjustment of the viewing angle of body 10 towards any direction. A rectangularly shaped assembly hole 22 is formed in the center portion of rotating portion 21 and a fixed protuberance 23 is installed in hole 22 to protrude from the bottom surface of rotating portion 21 for controlling the rotational angle of adjustment of the angle of view in the left and right directions.

Support stand 30 as shown in FIG. 2 includes concavely shaped supporting portion 31 extending from the center portion of the upper surface, for sliding engagement with rotating portion 21 during adjustment of the angle of view, assembly protuberance 32 projecting upwardly from the central location of supporting portion 31, for locking engagement with assembly hole 22 of rotating portion 21 in order to prevent disassembly of a pair of left and right rotational angle compensating ribs, 33 and 34, respectively projecting upwardly from both side surfaces of the upper surface of supporting portion 31, for controlling the angle of adjustment of fixed protuberance 23 by restricting movement to within a prescribed limited angle towards the left or right directions. An elastic tab 35 is formed by cut-opening a portion of the bottom surface of supporting portion 31 so as to allow right rotational angle compensating rib 34 to elastically move upwardly or downwardly.

A support tab 36 extends downwardly from elastic tab 35 in order to allow a user to elastically pull elastic tab 35 upwardly or downwardly, and thereby enable coupling or uncoupling between rotating portion 21 and supporting portion 31. Engagement tab 37 extends horizontally from the end portion of support tab 36 to allow a user to pull or push support tab 36 with more ease. Elastic tab 35, support tab 36 and engagement tab 37 are formed as integral component parts of support stand 30.

When performing the assembly procedure necessary to couple monitor rotator 20 with support stand 30, assembly protuberance 32 of supporting portion 31 is inserted into assembly hole 22 of rotating portion 21, rotation portion 21 is turned at an angle of forty-five degrees, and then fixed protuberance 23 of rotating portion 21 is allowed to be positioned between left and right rotational angle compensating ribs 33 and 34 of supporting portion 31. Subsequent to this assembly procedure, monitor rotator 20, is mounted on the bottom surface of monitor body 10, thereby allowing a user to control the angle of viewing the screen of the video monitor within an angular range of ninety degrees. In order to disassemble monitor rotator 20 from support stand 30, engagement tab 37 is pulled downwardly to move support tab 36 downwards, thereby permitting elastic tab 35 to bend elastically, and thus pulling right rotational angle compensating rib 34 downwards. Then, assembly protuberance 32 in monitor rotator 20 is turned at an angle permitting the uncoupling disassembly not affected by the displacement of right rotational angle compensating rib 34, thereby allowing the uncoupling of monitor rotator 20 and support stand 30.

In this type of conventionally adopted configuration of a video monitor, a viewer pushes or pulls body 10 with some degree of rotational force in order to obtain a proper view of the screen of the monitor display during its use. On occasion however, the user may inadvertently or through inexperience, apply excessive force to body 10 since its weight is relatively heavy. As a result, when excessive force is being applied to a video monitor, fixed protuberance 23 of supporting portion 21 strongly pushes right rotational angle compensating rib 34. Consequently, a strong pushing force is applied to right rotational angle compensating rib 34, thereby causing elastic tab 35 integrally formed therewith to bend downwardly. Fixed protuberance 23 is then free from any obstruction to stop its rotation and is allowed to turn over right rotational angle compensating rib 34, thus causing an unintended deviation from the range of viewing angle adjustment.

Monitor rotator 20 is often turned at an angle in order to be uncoupled from stand support 30. Since monitor rotator 20 is integrally assembled with monitor body 10, the disassembly of monitor rotator 20 entails a disassembly of monitor body 10 from stand support 30. Consequently, such a conventional configuration of a monitor display apparatus in the public domain is hampered by the likelihood that monitor body 10 will become uncoupled from stand support 30 when an excessive amount of force is applied thereto so as to adjust the viewing angle by rotating monitor body. Therefore, the relatively heavy video monitor is subject to a risk of damage when dropped from, for example, a monitor table or a desk to a floor.

Figure 4:
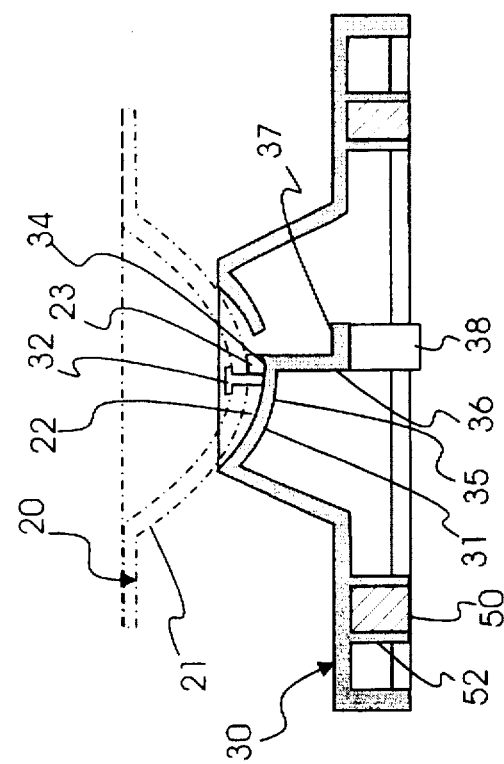
FIG. 4 is a cross-sectional elevational view showing a monitor rotator and a stand support in assembled form, of an exemplar embodiment constructed according to the principles of the present invention.
Figure 5:
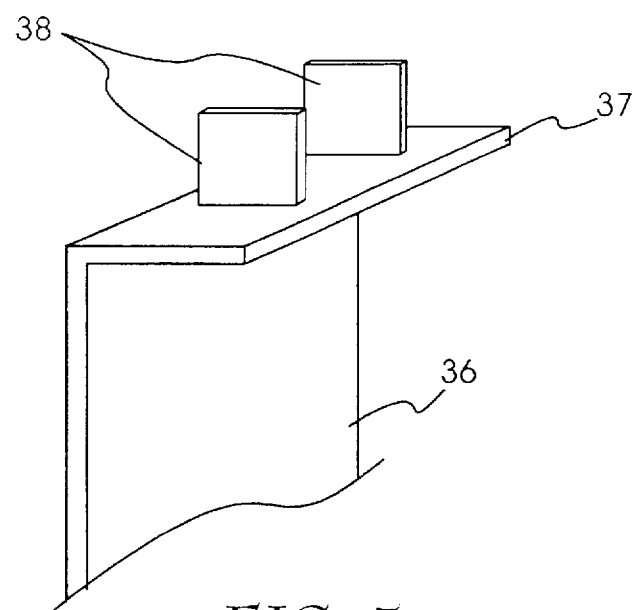
FIG. 5 is a perspective detailed view of a rotation prevention protrusion assembled with an engagement tab, for an exemplar embodiment constructed according to the principles of the present invention.
Figure 6:
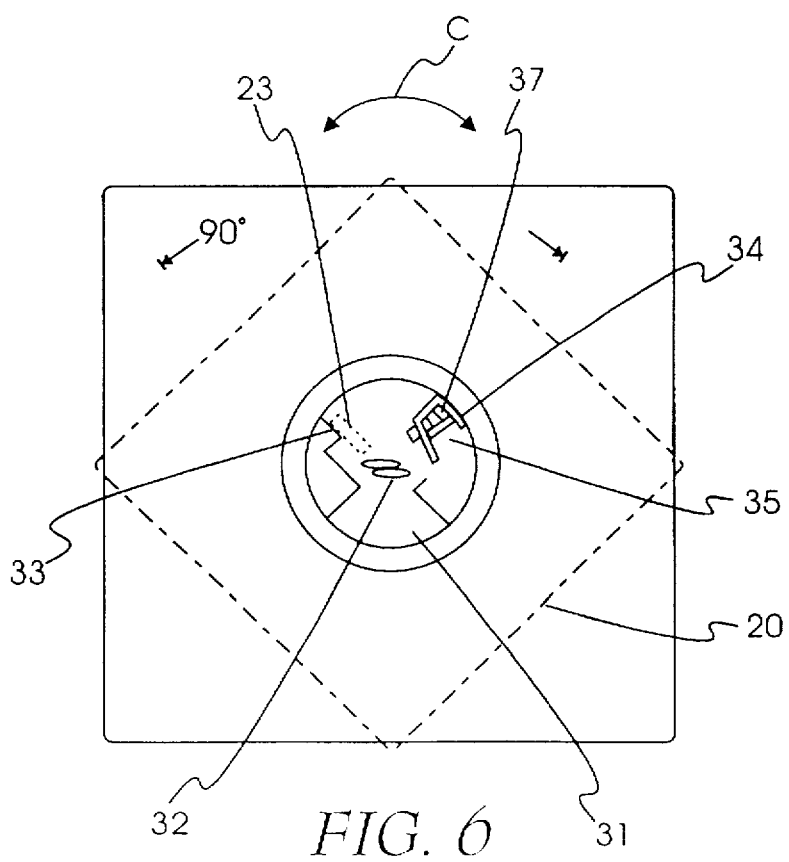
FIG. 6 is a plan view illustrating the monitor rotator and the stand supporting the monitor, shown in FIG. 4, in assembled form.

FIGS. 4 through 6 illustrate one preferred embodiment of a view angle compensator constructed according to the principles of the present invention. As illustrated by phantom lines in FIGS. 4 and 5, monitor rotator 20 includes rotating portion 21 formed in a convex shape and extending downwardly from the central portion of the bottom surface of rotator 20 so as to enable adjustment of the angle of view to any direction. Rectangularly shaped assembly hole 22 is formed substantially at the central surface of rotating portion 21, and fixed protuberance 23 extends from the upper surface of rotating portion 21 for adjustment of left and right angles of viewing.

Support stand 30 includes a concavely shaped supporting portion 31 extending upwardly from the center portion thereof, to make sliding contact with rotating portion 21 of monitor rotator 20 and to enable adjustment of the viewing angle. Assembly protuberance 32 extends to protrude from the center of the upper surface of supporting portion 31 at a right angle for insertion into assembly hole 22 of rotating portion 21 so as to secure an engagement between support stand 30 and rotator 20.

Stand support 30 also has a pair of left and right rotational angle compensating ribs 33 and 34, respectively extended from both of the opposite side surfaces of the upper surface of supporting portion 31, for controlling the angle of rotation of fixed protuberance 23 of monitor rotator 20 in the left and right directions, to within a predetermined angle Θ°. Right rotational angle compensating rib 34 is formed by a protrusion 34A like right rotational angle compensating rib 33, and a somewhat triangularly shaped protrusion 34B; rotation in the right and left directions is physically limited by protrustions 34A, 34B. An open cut 34C is formed just beyond protrustion 34B. Elastic tab 35 is formed with cut-open 34C of supporting portion 31 so as to allow right rotational angle compensating rib 34 to move flexibly in vertically up and down directions. Support tab 36 protrudes and extends downwardly from an end portion of elastic tab 35 in order to allowing rotating portion 21 and supporting portion 31 to be coupled during assembly or uncoupled during disassembly by a manipulation of elastic tab 35 respectively, in upward or downward directions. Engagement tab 37 extends horizontally from the end portion of support tab 36 to enable a viewer to more conveniently push or pull support tab 36.

Support stand 30 also has rotation preventing protrusion 38 extending downwardly from and perpendicular to the bottom surface of engagement tab 37 so as to support elastic tab 35 when any excessive force is applied to monitor body 10 during manual adjustment of the viewing angle.

Referring specifically to FIG. 5, in one embodiment, rotation preventing protrusions 38 are configured to extend downwardly from the bottom surface of engagement tab 37 integrally formed with support tab 36, and is shaped with a pair of rectangular plate rotation preventing protrusions 38 arranged to contact whatever desktop or other surface on which stand support 30 is located. A pair of protrusions 38 are preferably provided as at least a pair of plates having the same configuration, thereby providing more stable support for engagement tab 37 than would a single like shaped plate. Rotation preventing protrusions 38 are arranged to have a length D that is slightly longer than the lower portion of support stand 30 (e.g., by approximately two millimeters), thereby securing more stable support for stand 30 and its heavy load, namely the body 10 of the video monitor.

Referring again to FIGS. 4, 5 and 6 collectively, a view angle compensator for a video monitor constructed as one embodiment of the present invention is explained in detail. To couple monitor rotator 20 with stand support 30, assembly protuberance 32 on supporting portion 31 is first inserted into assembly hole 22 in rotating portion 21, rotating portion 21 is turned at an angle of forty-five degrees, and then fixed protuberance 23 is arranged on rotating portion 21 to be positioned between the pair of left and right rotational angle compensating ribs 33 and 34 in supporting portion 31. Then, monitor rotator 20 is engagedly assembled to the bottom surface of monitor body 10, allowing the angle of monitor body 10 to turn in the right and left horizontal directions with a maximum range of Θ° equal to ninety degrees, as is necessary.

In this embodiment of the present invention, the weight of monitor body 10 being applied to elastic tab 35 in support stand 30 is transferred and loaded onto rotation preventing protrusion 38 via support tab 36 and engagement tab 37. As a result, the weight of monitor body 10 weighing upon rotation preventing protrusion 38 is transferred to the surface of a table or a desk. Consequently, rotation preventing protrusion 38 is heavily loaded in the vertical direction (that is, from top to the bottom direction), thereby stably supporting elastic tab 35.

Accordingly, elastic tab 35 is restricted from bending bend downwardly without pulling up stand support 30. An excessive pulling force applied by a viewer to monitor body 10 when adjusting the angle of view is therefore not able to force elastic tab 35 to move downwardly, and consequently, fixed protuberance 23 on monitor rotator 20 is not allowed to slip over right rotational angle compensating rib 34. Additionally, rotation preventing protrusion 38 according to one embodiment of the present invention is arranged to have a length slightly longer (e.g., by approximately two millimeters than the height of the lower portion of support stand 30. When applied to support stand 30 in this embodiment of the present invention, rotation preventing protrusion 38 pushes elastic tab 35 upwardly so as to slightly bend owing to the function of the longer length of protrusion 38. In turn, right rotational angle compensating rib 34 provided on elastic tab 35 is forced to move upwardly thereby preventing fixed protuberance 23 from sliding over.

To uncouple monitor rotator 20 from stand support 30 during disassembly, the video monitor is first tilted to allow rotation preventing protrusion 38 to be spaced apart from the surface (i.e., the top surface of a table or desk), support tab 36 is pulled down by pushing engagement tab 37 in order to thereby allow elastic tab 35 to bend flexibly so as to force right rotational angle compensating rib 34 downwardly. Consequently, fixed protuberance 23 provided on monitor rotator 20 is enabled to slidingly move over right rotational angle compensating rib 34 at an angle at which monitor rotator 20 can easily be uncoupled during disassemble from stand support 30.

As explained above, by preventing monitor body and stand support from being erroneously disassembled by an excessive force applied during the compensation period of a view angle compensator of one preferred embodiment according to the present invention prevent a monitor body from being damaged, thereby enhancing a product reliability.

While there have been illustrated and described what are considered to be embodiments of the present invention, it will be understood by those skilled in the art that various changes and modifications may be make, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments failing within the scope of the appended claims.

What is claimed is:

1. A view angle compensator for a monitor display apparatus, said view angle compensator comprising:

a monitor rotator integrally assembled with an underside of said monitor display apparatus, said monitor rotator having a fixed protuberance protrudently extended from a first side of said rotator restricting manual rotation of said monitor display apparatus in left and right angular directions of said monitor display apparatus; and a stand support comprising a supporting portion, an elastic tab, a support tab, an engagement tab and a combination of left and right rotational angle compensation ribs respectively extending from both sides of the upper portion of said supporting portion for controlling a rotation of said fixed protuberance provided on said monitor rotator to turn left or right directions within the range of a predetermined angle;

said elastic tab provided and formed on the bottom surface of said supporting portion for allowing said right rotational angle compensating rib to flexibly move upwards and downwards; said support tab allowing assembly and disassembly of said rotating portion and said supporting portion by moving said elastic tab upwardly and downwardly;

said engagement tab extended horizontally from an end portion of said support tab, for pulling and pushing down said support tab; and a rotation preventing protrusion protrudently extending downwardly from a bottom side of said engagement tab to reinforce said elastic tab and limiting said left and right rotational angles by obstructing passage of said fixed protuberance while engaging any underlying surface supporting said stand.

2. The view angle compensator as claimed in claim 1, comprised of a second said protrusion positioned, spaced apart from said rotation preventing protrusion and extending transversely from said engagement tab to engage any underlying surface.

3. The view angle compensator as claimed in claim 2, wherein a plurality of said rotation preventing protrusion and said second protrusion have the same configuration.

4. The view angle compensator of claim 1, with said stand support having a peripheral region defining a plane while engaging the underlying surface, further comprised of said rotation preventing protrusion extending from said engagement tab perpendicularly to said plane.

5. The view angle compensator of claim 1, with said stand support having a peripheral region defining a plane while engaging the underlying surface, further comprised of said rotation preventing protrusion extending perpendicularly across said plane.

6. The view angle compensator of claim 1, with said stand support having a peripheral region defining a plane while engaging the underlying surface, further comprised of said rotation preventing protrusion extending across said plane while said peripheral region is not engaging any underlying surface.

7. The view angle compensator of claim 1, further comprised of said supporting portion, said, elastic tab, said support tab, said engagement tab, said rotational angle compensation ribs, and said rotation preventing protrusion are formed a continuous integrated structure.

8. The view angle compensator of claim 7, with said stand support having a peripheral region defining a plane while engaging the underlying surface, further comprised of said rotation preventing protrusion extending from said engagement tab perpendicularly to said plane.

9. The view angle compensator of claim 7, with said stand support having a peripheral region defining a plane while engaging the underlying surface, further comprised of said rotation preventing protrusion extending perpendicularly across said plane.

10. The view angle compensator of claim 7, with said stand support having a peripheral region defining a plane while engaging the underlying surface, further comprised of said rotation preventing protrusion extending across said plane while said peripheral region is not engaging any underlying surface.

11. A view angle compensator for a monitor display apparatus, comprising:

a rotator having a first side providing a surface for supporting a video monitor while accommodating manual tilt and rotation of the monitor, said rotator having a convex position centrally disposed within said surface and extending convexly outwardly from a second and opposite side of rotator and a protuberance borne by said convex portion extending outwardly from said second side; and a monolithic stand providing a third side having outer regions defining a plane, a fourth and opposite side bearing a centrally positioned support truncated by a concave region supporting said convex portion during said tilt and rotation of the monitor, and a protrusion formed with said support and said concave region as an integral component part of said stand extending radially from within said concave region to interact with said protuberance and engage at a location spaced apart from but surrounded by said outer regions, any surface supporting said third side while engaging said protuberance and restricting said rotation.

12. The compensator of claim 11, further comprising said protrustion extending through said plane.

13. The compensator of claim 11, further comprising said protrusion extending from said concave region perpendicularly across said plane.

14. The compensator of claim 11, with said protrusion comprising:

a second support extending traversely across a distal end of said protrusion most distant from said concave region; and a plurality of spaced apart tabs extending traversely to said second support and away from said rib to engage any said underlying surface.

15. The compensator of claim 11, with said protrusion comprising:

a second support extending traversely across a distal end of said protrusion most distant from said concave region; and a plurality of spaced apart tabs extending traversely away from said second support and extending traversely through said plane.

16. The compensator of claim 11, comprised of said outer regions defining said plane while engaging any said underlying surface, and said protrusion extending radially away from said concave region and traversely across said plane.

* * * * *